(12) United States Patent
Anderson et al.

(10) Patent No.: US 7,681,073 B2
(45) Date of Patent: *Mar. 16, 2010

(54) ARBITRATION SYSTEM FOR REDUNDANT CONTROLLERS, WITH OUTPUT INTERLOCK AND AUTOMATIC SWITCHING CAPABILITIES

(75) Inventors: Gary D. Anderson, Austin, TX (US); Gerald J. Fahr, Wappingers Falls, NY (US); Raymond J. Harrington, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/259,447

(22) Filed: Oct. 28, 2008

(65) Prior Publication Data

US 2009/0055002 A1   Feb. 26, 2009

Related U.S. Application Data

(63) Continuation of application No. 11/765,143, filed on Jun. 19, 2007, now Pat. No. 7,461,291, which is a continuation of application No. 10/820,177, filed on Apr. 7, 2004, now Pat. No. 7,290,170.

(51) Int. Cl.
*G06F 11/00* (2006.01)
(52) U.S. Cl. .............................. 714/11; 714/4; 714/12; 714/13
(58) Field of Classification Search ........................ None
See application file for complete search history.

(56) References Cited

U.S. PATENT DOCUMENTS

| | | | |
|---|---|---|---|
| 4,527,271 A | 7/1985 | Hallee et al. | |
| 5,185,693 A | 2/1993 | Loftis et al. | |
| 5,975,738 A | 11/1999 | DeKoning et al. | |
| 6,035,416 A | 3/2000 | Abdelnour et al. | |
| 6,094,736 A | 7/2000 | Komoike | |
| 6,327,670 B1 | 12/2001 | Hellenthal et al. | |
| 6,334,194 B1 | 12/2001 | Hihara | |
| 6,412,068 B1 | 6/2002 | Nolan et al. | |
| 6,591,150 B1 | 7/2003 | Shirota | |
| 6,832,331 B1 | 12/2004 | Manning | |
| 6,996,741 B1 | 2/2006 | Pittelkow et al. | |
| 2001/0016920 A1 | 8/2001 | Chan | |

(Continued)

FOREIGN PATENT DOCUMENTS

JP    63-247846    10/1988

(Continued)

*Primary Examiner*—Yolanda L Wilson
(74) *Attorney, Agent, or Firm*—Geraldine Monteleone, Esq.; Kevin P. Radigan, Esq.; Heslin Rothenberg Farley & Mesiti, P.C.

(57) ABSTRACT

An arbitration mechanism is provided for arbitrating between redundant controllers having outputs electrically connected together and provided as input to at least one device under control. The arbitration mechanism includes logic for automatically determining which controller of the redundant controllers is active controller, and a hardware output interlock for the redundant controllers to ensure that output controlled by only the active controller is enabled as input to the at least one device. The arbitration mechanism also includes logic for monitoring the active controller for failure, and upon detection of failure, for automatically switching active control to another controller of the redundant controllers transparent to the at least one device.

6 Claims, 7 Drawing Sheets

U.S. PATENT DOCUMENTS

| | | |
|---|---|---|
| 2002/0099972 A1 | 7/2002 | Walsh et al. |
| 2002/0133740 A1 | 9/2002 | Oldfield et al. |
| 2002/0133744 A1 | 9/2002 | Oldfield et al. |
| 2003/0023892 A1 | 1/2003 | Giovanni |
| 2004/0073833 A1 | 4/2004 | Krishnamurthy et al. |

FOREIGN PATENT DOCUMENTS

| | | |
|---|---|---|
| JP | 02-036429 | 2/1990 |
| WO | WO 94/19744 A1 | 9/1994 |

ARBITRATION SYSTEM FOR REDUNDANT CONTROLLERS, WITH OUTPUT INTERLOCK AND AUTOMATIC SWITCHING CAPABILITIES

CROSS-REFERENCE TO RELATED APPLICATION

This application is a continuation of co-pending U.S. patent application Ser. No. 11/765,143, filed Jun. 19, 2007, entitled "Arbitration Method for Redundant Controllers, With Output Interlock and Automatic Switching Capabilities", by Anderson et al., which is a continuation of U.S. Letters Patent No. 7,290,170, issued Oct. 30, 2007 (formerly U.S. patent application Ser. No. 10/820,177, filed Apr. 7, 2004), entitled "Arbitration Method and System for Redundant Controllers, With Output Interlock and Automatic Switching Capabilities", by Anderson et al., the entirety of each of which is hereby incorporated herein by reference.

TECHNICAL FIELD

The present invention relates in general to the field of redundancy control systems, and more particularly, to an arbitration mechanism for redundant controllers, which employs a hardware output interlock for the redundant controllers and an automatic switchover capability between the redundant controllers.

BACKGROUND OF THE INVENTION

Redundancy in many types of systems is provided in order to increase reliability. For example, for a system complex run by a controller, system availability can be greatly improved if the controller can be made redundant. A controller in a server system may perform functions such as powering on/off and configuring the system, as well as communicating setup and status information to processor, memory and input/output (I/O) elements. Failure of such a controller would make the server system inoperable.

To implement redundant controllers a selection mechanism is required to determine which controller will be active controller in charge of the device or system under control, and which controller is idle controller waiting as backup. The selection mechanism or arbitration function is complicated in an environment where the outputs of the redundant controllers are to be electrically connected together externally and provided as input to a device/system under control.

Applicants recognize that in such an environment, the design implementation should ensure that the outputs of the redundant controllers are not capable of being enabled at the same instance in time in order to avoid possible conflicting data or potential damage to the device under control. The present invention is directed to providing a mechanism to address these arbitration needs within the noted environment where outputs controlled by redundant controllers are electrically connected together and provided as input to the device under control.

SUMMARY OF THE INVENTION

In one aspect, provided herein is a method for providing arbitration of redundant controllers, which includes: providing logic for automatically determining which controller of the redundant controllers is active controller, wherein outputs controlled by the redundant controllers are electrically connected together and provided as input to at least one device; and providing a hardware output interlock for the redundant controllers to ensure that output controlled by only the active controller is enabled as input to the at least one device.

In another aspect, a method of arbitrating between redundant controllers is provided. This method includes: automatically determining which controller of the redundant controllers is active controller, wherein outputs controlled by the redundant controllers are electrically connected together and provided as input to at least one device; monitoring the active controller for failure; and upon detection of failure, automatically switching active control to another controller of the redundant controllers, wherein the automatic switching of active control to the another controller of the redundant controllers is transparent to the at least one device.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein in one aspect is an arbitration mechanism for redundant controllers controlling a device, system, system complex, hardware component, bus, etc. (generally referred to herein as a "device" or "device under control"). Outputs controlled by the redundant controllers are electrically connected together and provided as input to one or more devices under control. In accordance with the arbitration mechanism, software logic automatically determines which controller of the redundant controllers is active controller, and a hardware output interlock ensures that output of only the active controller is enabled as input to the one or more devices under control. The arbitration mechanism also includes logic for detecting failure of an active controller and for automatically switching over active control to another controller of the redundant controllers, wherein the automatic switching of active control to the another controller is transparent to the one or more devices under control.

As described further below, one embodiment of an arbitration mechanism in accordance with an aspect of the present invention employs hardwired identification bits for each controller of the redundant controllers, a software arbitration component or algorithm for determining the active controller and the idle controller, as well as a switchover function should the active controller fail, a watch dog timer for each controller (e.g., implemented within the hardware arbitration component), and a state machine (also implemented as part of the hardware arbitration component) to enable or disable controller outputs as a fail safe to ensure that outputs controlled by only one controller are enabled at a time. Although presented as employing hardwired identification bits, any technique for identifying the controllers may be used with a deterministic approach for deciding which controller is by default active controller. Because the outputs controlled by the redundant controllers are tied together and provided as a single set of inputs to the device under control, switching active control from one controller to another controller can be transparent to the device, with the controllers assumed to comprise at least two fully redundant controllers.

Figure 1:
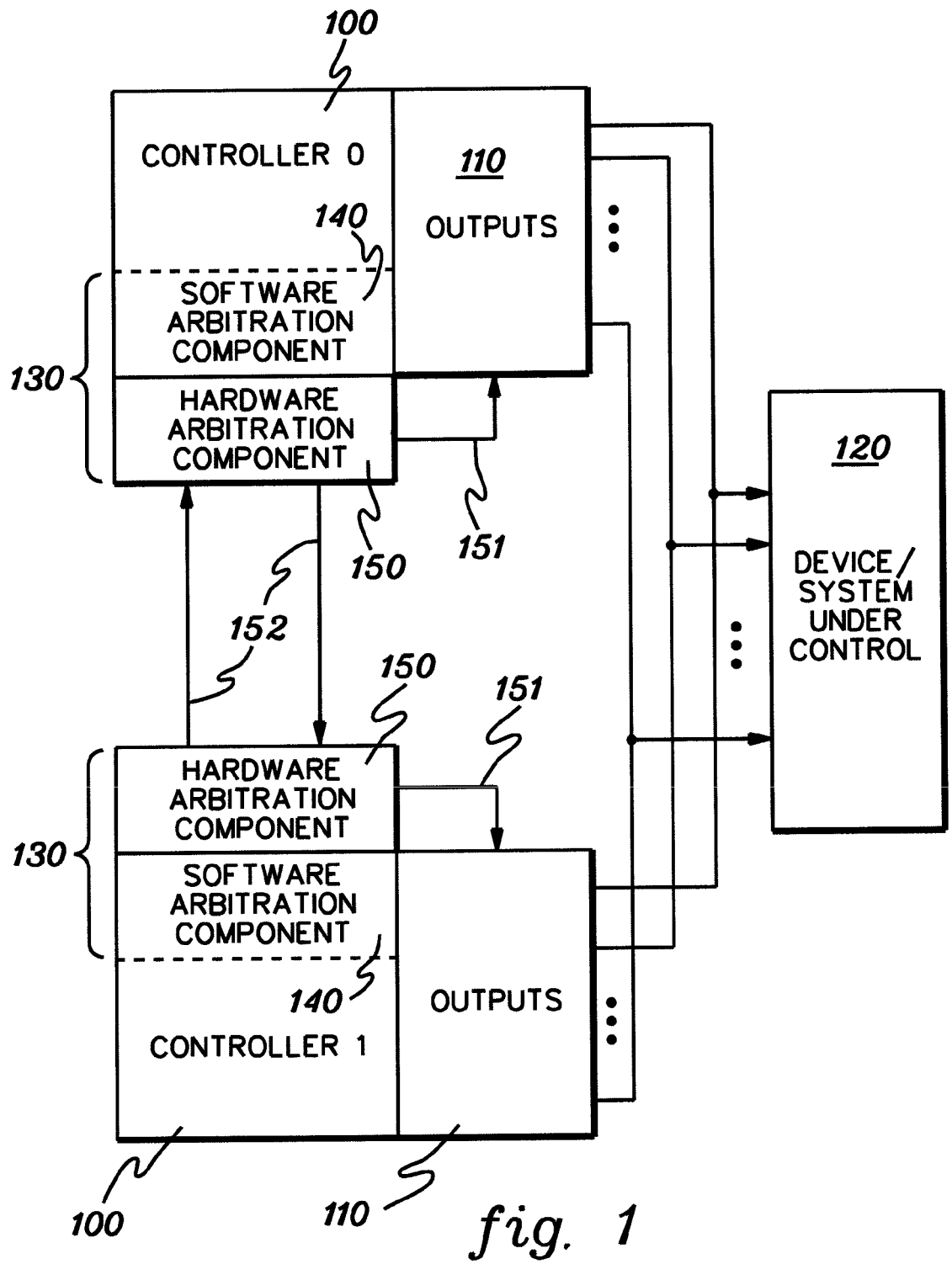
FIG. 1 is a block diagram of one embodiment of redundant controllers having their controlled outputs electrically connected together and provided as input to a device under control, and having an arbitration mechanism, in accordance with an aspect of the present invention.

One example of an arbitration mechanism in accordance with the present invention is depicted in FIG. 1. In this example, two redundant controllers 100 (i.e., controller 0, controller 1) control respective outputs 110, which may comprise direct outputs from the controllers or outputs from other circuitry controlled by the respective controllers. As shown, outputs 110 are electrically connected together and provided as one set of inputs to the device/system under control 120. In this embodiment, an arbitration mechanism 130 (in accordance with the present invention) includes a software arbitration component 140 and a hardware arbitration component 150. As explained below with respect to FIGS. 3A & 3B, signals 152 are exchanged between the controllers 100, as well as arbitration mechanisms 130. Output from each hardware arbitration component 150 is an enable/disable signal 151 which is the fail safe hardware interlock enable signal controlling which outputs 110 are provided as input to the device/system under control 120.

Figure 2A:
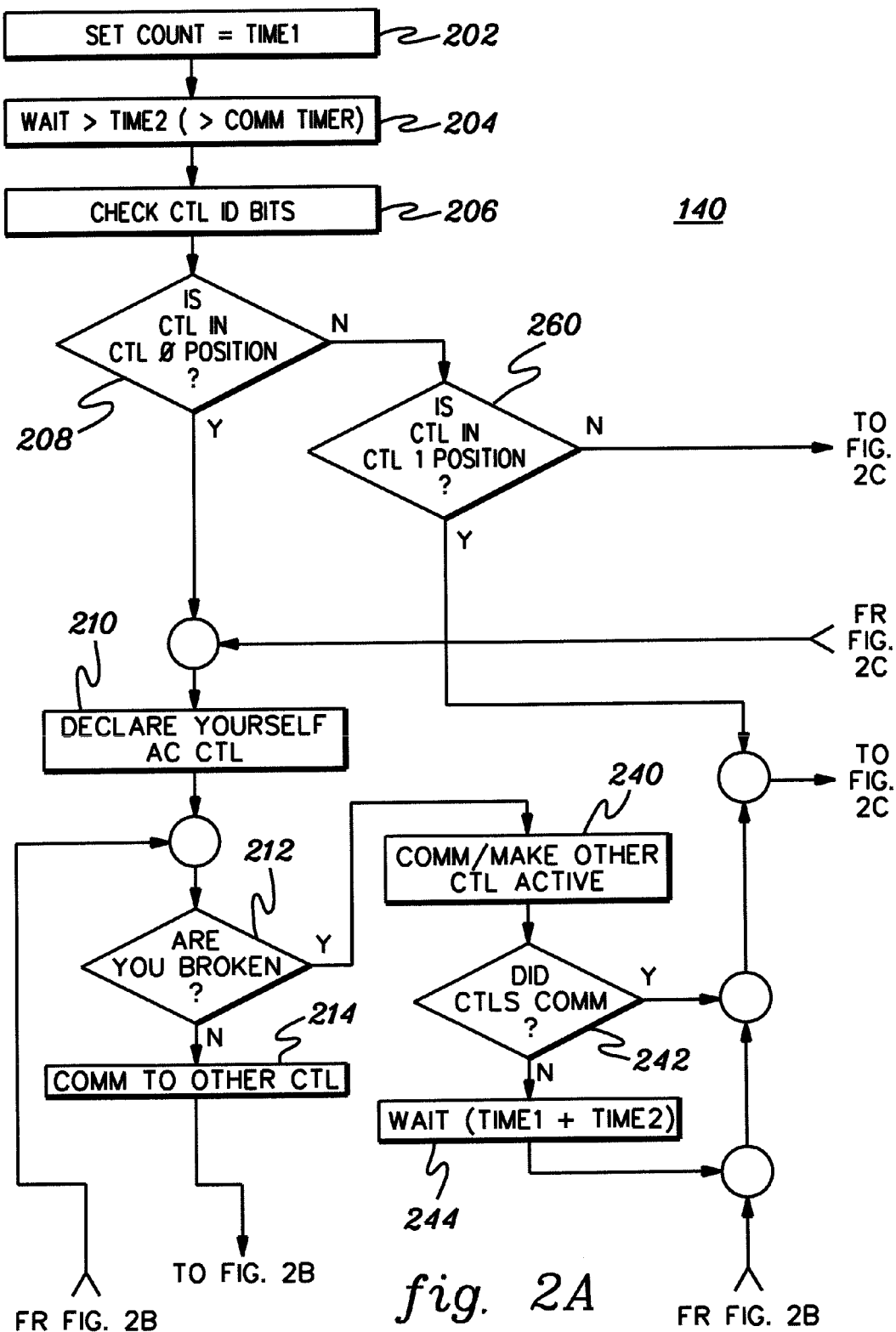
FIGS. 2A-2C are a flowchart of one embodiment of arbitration logic for arbitrating between redundant controllers to automatically determine an active controller and automatically switch control from one controller to another controller upon failure of the active controller, in accordance with an aspect of the present invention.
Figure 2B:
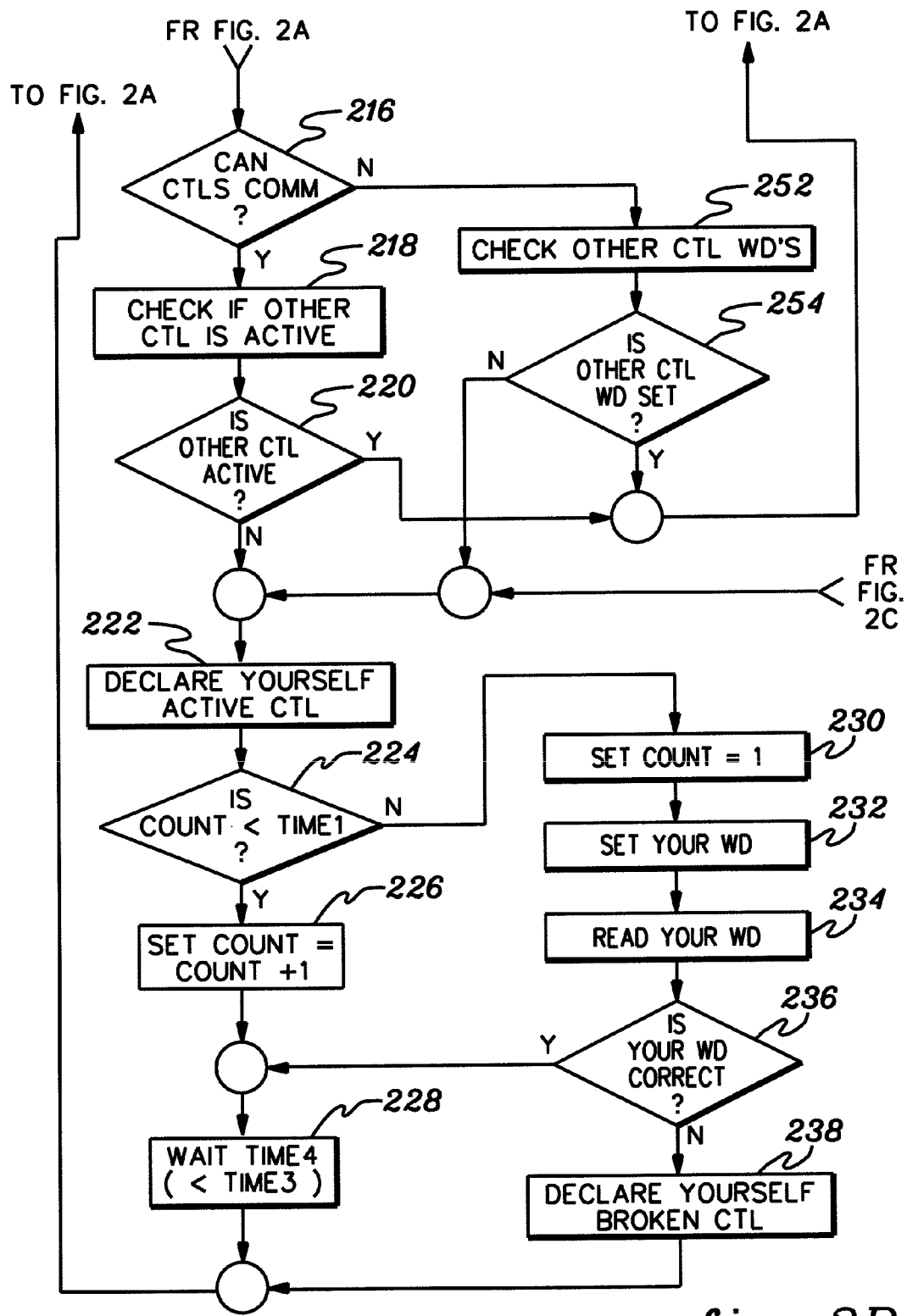
Figure 2C:
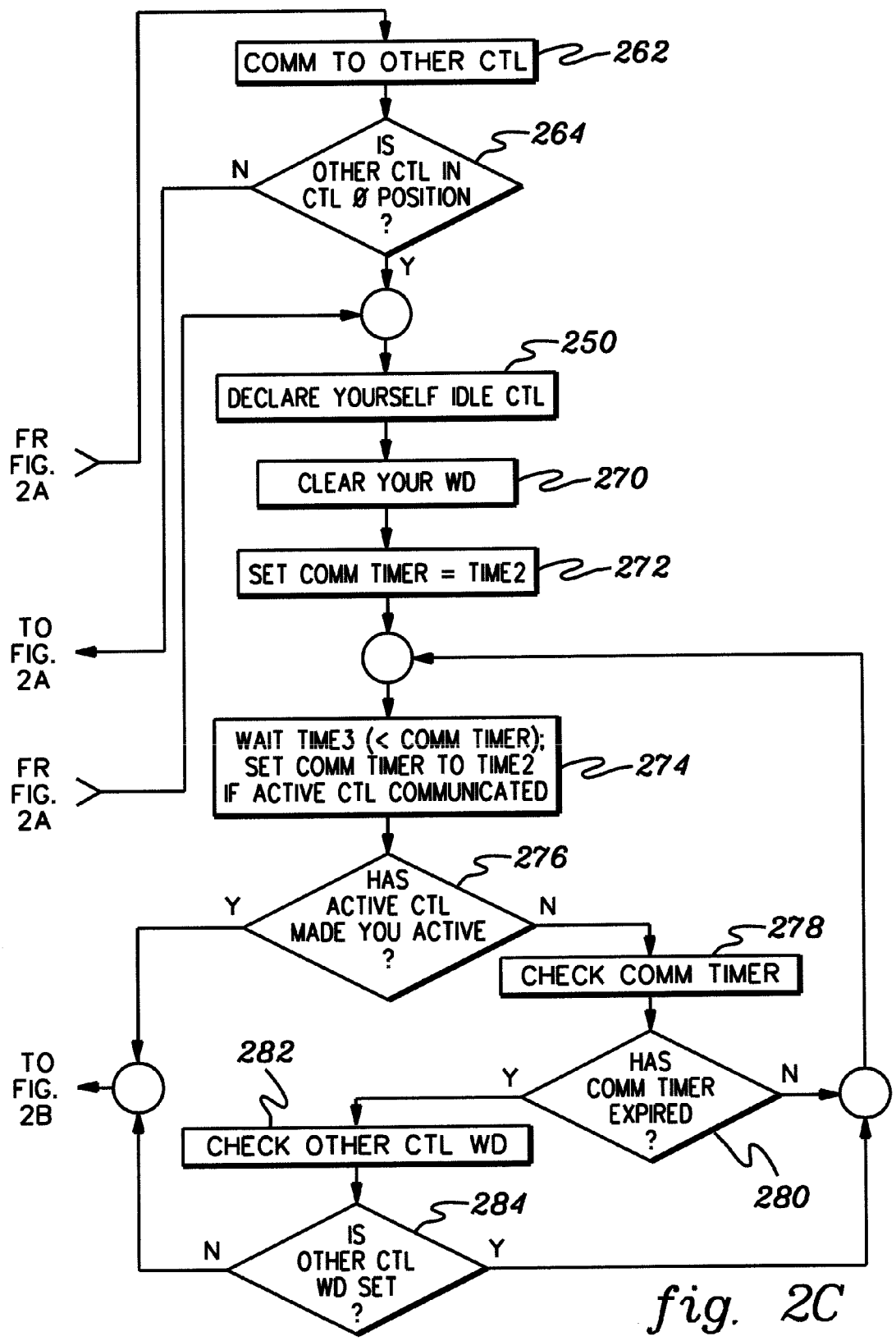

FIGS. 2A-2C depict one example of logic implemented by software arbitration component 140 of FIG. 1. The logic begins in FIG. 2A by setting a counter labeled "count" equal to time1 202. As explained further below, four time intervals, i.e., time1, time2, time3 and time 4, are employed by this logic. By way of specific example, time1 might comprise 10 seconds, time2 1.5 seconds, time3 0.5 seconds and time4 1 second. The "count" is an amount of time that processing proceeds through the logic of FIG. 2.

Processing next waits for more than a second time, time2 204. Time2 is also referred to herein as the communication timer (i.e., "comm timer"), and processing initially waits sufficient time to ensure that the communication timer period has expired before proceeding.

The associated controller's id bits are checked 206 to determine the identification of the controller. In this example, two redundant controllers are assumed employed as shown in FIG. 1. The controllers can be identified by hardwired identification bits; for example, board pins may be used to determine which position a controller is in, i.e., whether the controller is controller 0 or controller 1. Processing determines whether the associated controller is in controller 0 position 208. If so, processing declares itself the active candidate controller 210 and determines whether the associated controller has failed 212. If "no", then an attempt to communicate with the other controller is made 214. Processing confirms that the controllers can communicate 216 (see FIG. 2B). If so, a determination is made whether the other controller is active 218, 220. If "no", then processing declares its controller the active controller 222 and determines whether the variable "count" is less than time1 224. If "yes", then processing sets "count" equal to "count+1" 226 and waits time4, before looping back to inquiry 212 (see FIG. 2A) to determine whether the associated controller has failed.

As shown in FIG. 2A, if the associated controller has failed (i.e., is broken), then the logic informs the other controller that it should be active controller 240, and confirms that the controllers communicated 242. If so, processing declares itself idle controller 250 (FIG. 2C). If the controllers did not communicate, then processing waits time1+time2 244 (FIG. 2A) to ensure that the second controller recognizes that the first controller has failed (i.e., has timed out). Processing then declares itself idle controller 250.

As shown in FIG. 2B, if the two controllers could not communicate at inquiry 216, then processing checks the other controller's watch dog timer 252. As explained below, only the arbitration software component of the selected active controller proceeds to set a watch dog timer for its set of hardware, which allows its associated outputs to be enabled. The arbitration software component of the idle controller does not set a watch dog timer for its hardware arbitration component, thereby maintaining its controlled outputs disabled. Processing thus determines whether the other controller's watch dog timer is set 254, and if "yes", then declares itself idle controller 250 (FIG. 2C) since only one controller can have active control. If the other watch dog timer is not set, then processing declares itself active controller 222, and proceeds as described above.

After declaring itself active controller, if the count value is greater than or equal to time1, then processing sets count equal to 1 230 (FIG. 2B) and sets its watch dog timer 232. Optionally, its watch dog timer can then be read 234 to verify that it has been set correctly 236 and if so, processing waits time4 228 before looping back to determine whether the associated controller has failed 212 (FIG. 2A). If the watch dog timer is not correct, then processing declares a controller failure 238.

If the associated controller is in other than control 0 position, then from inquiry 208 (FIG. 2A) processing confirms that the controller is in control 1 position 260. If "no", processing communicates with the other controller 262 (FIG. 2C) to attempt recovery from an apparent invalid id. If the other controller is in control 0 position 264, then the arbitration software declares its associated controller the idle controller 250. Otherwise, processing declares itself an active candidate controller 210 (FIG. 2A) and attempts to obtain active control as explained above.

Assuming that the controller is in the controller 1 position, then processing declares itself the idle controller 250 (FIG. 2C) and clears its watch dog timer 270, again to ensure that its controller's controlled outputs are disabled. Processing then sets the communication timer equal to time2 272 and waits time3 274, which is less than the time of the communication timer. As noted above, the communication timer might be set to 1.5 seconds, which is a periodic time within which the controllers communicate. Processing then determines whether the other active controller has requested that its associated controller be active 276 and if "no", then checks the communication timer 278. If the communication timer has not expired 280, processing returns to wait time3 274. Otherwise, processing checks the other controller's watch dog timer 282 and determines whether the other controller's watch dog timer is set 284. If "yes", then processing returns to wait time3 274. Otherwise, processing declares its associated controller active controller 222 (FIG. 3B). If a first controller has made a second controller active controller, then from inquiry 276 the second controller declares itself active controller 222.

Figure 3A:
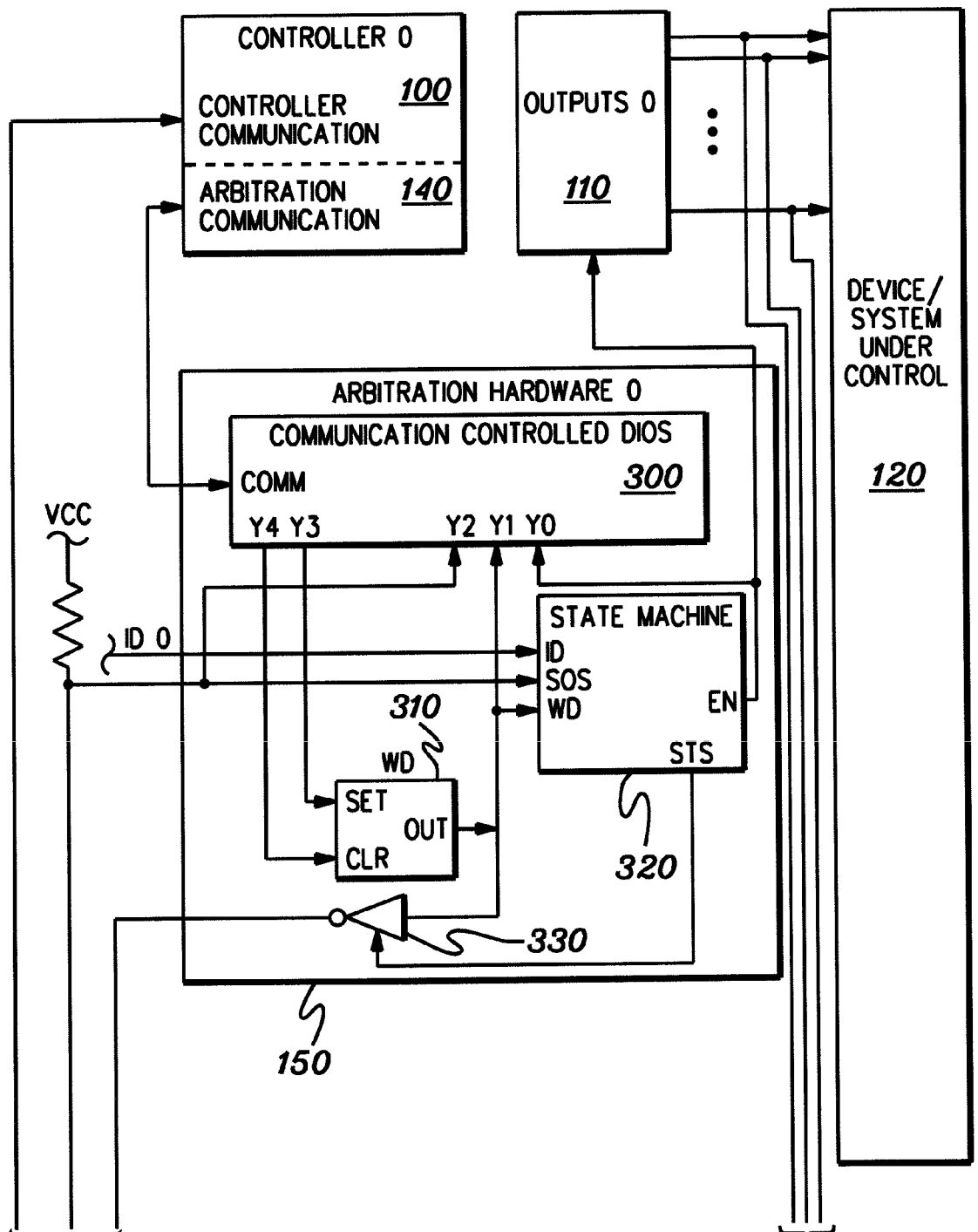
FIGS. 3A & 3B are a more detailed diagram of the redundant controllers of FIG. 1, showing one embodiment of arbitration hardware providing an output interlock between the redundant controllers, in accordance with an aspect of the present invention.
Figure 3B:
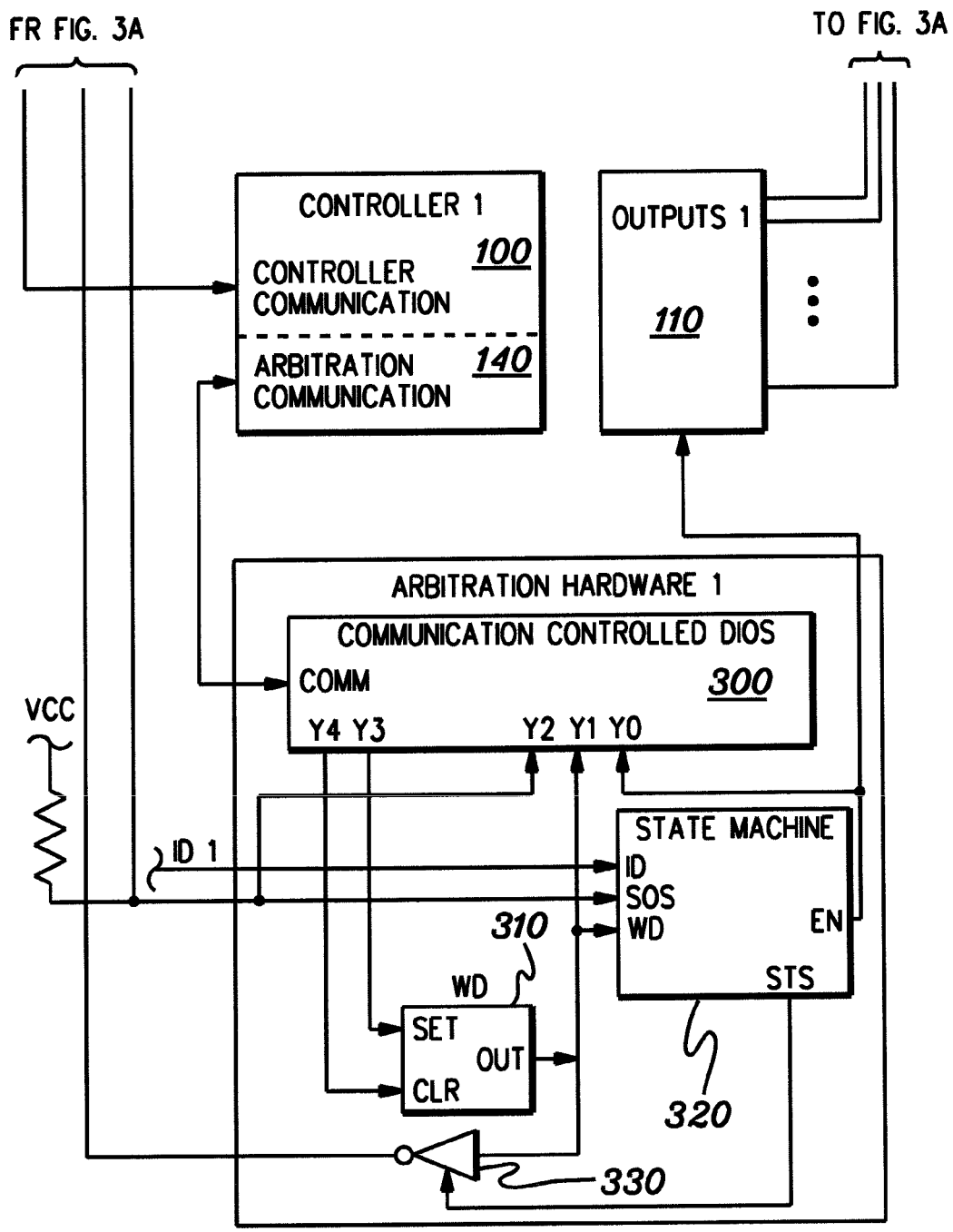

FIGS. 3A & 3B depict a more detailed example of the circuitry of FIG. 1 showing one embodiment of the arbitration hardware components 150. As shown, each arbitration hardware component 150 communicates with arbitration software component 140 of the associated controller 100 (controller 0, controller 1). Only one of the arbitration hardware circuits provides an enable signal to outputs 110 controlled by the associated controllers 100. These outputs 110 are then provided as input to the device/system under control 120.

Within arbitration hardware 150 are shown communication controlled digital inputs/outputs (DIOS) 300. Output from DIOS 300 are signals Y4, Y3 which are sent to the clear and set inputs, respectively, of a watch dog timer circuit 310. The set and clear outputs from DIOS 300 are controlled by the arbitration software 140, pursuant to the logic discussed above. Output from watch dog timer circuit 310 is a signal "WD" which must be low at power on. Signal "WD" is provided as one input to a state machine 320, as well as to an input Y1 of DIOS 300. Input Y1 informs the arbitration software of the state of its own watch dog timer output. Also input to state machine 320 is the identification "ID" of the associated controller, as well as the state of the other side "SOS" (i.e., the state of the watch dog timer of the arbitration hardware component of the redundant controller). Also provided to DIOS 300 is the "SOS" signal as input Y2, and the "EN" signal output from state machine 320 as input Y0. These signals are again used in the arbitration software logic discussed above in connection with FIGS. 2A-2C. The watch dog timer output "WD" is also provided to an inverter 330 controlled by a state of this side "STS" signal from state machine 320. Output from inverter 330 is provided as the "SOS" signal to the other hardware arbitration component 150 as shown. Should the associated controller fail, then the "SOS" signal is fed to the other arbitration hardware by a resistor and VCC as shown.

Figure 4:
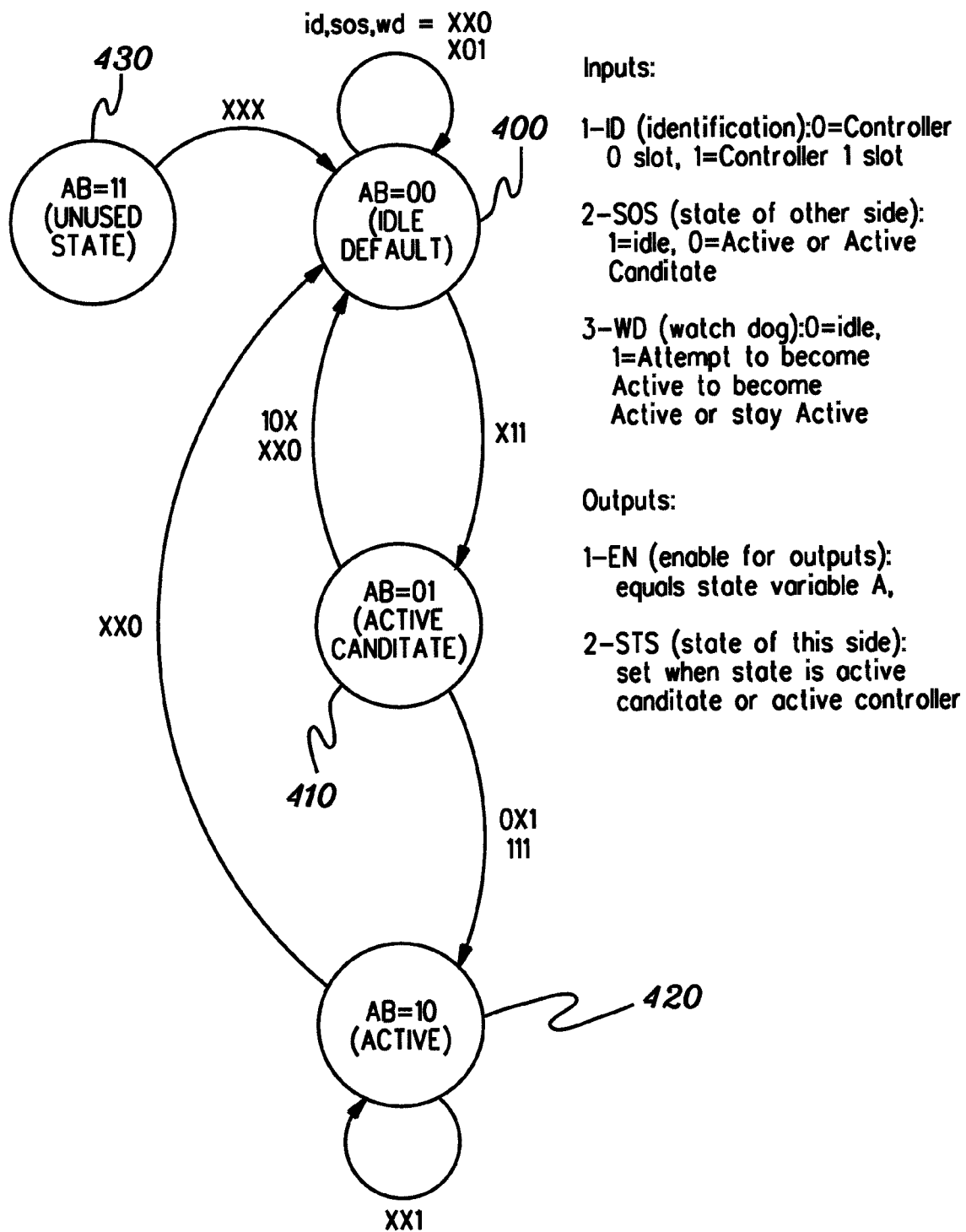
FIG. 4 depicts one embodiment of a state machine for the output interlock of FIGS. 3A & 3B, in accordance with an aspect of the present invention.

FIG. 4 depicts one example of state machine 320 for the arbitration hardware component 150. Generally, the status of the watch dog timer signal from each controller hardware is used as input to the state machine to determine whether or not the outputs controlled by the associated controller should be enabled. The setting of the active controller's watch dog timer, in conjunction with the idle controller's watch dog timer not being set, enables the output controlled by the active controller. The state machine is designed such that this hardware interlock mechanism never allows outputs controlled by both controllers to be enabled at the same time, not even for an instant. The arbitration software component of the idle controller frequently monitors the status of the watch dog timer of the active controller. Upon failure of the active controller, the arbitration software component allows the idle controller to take over and become the active controller. The new active controller sets its watch dog timer, allowing its outputs to then be enabled as long as the outputs of the old active controller are disabled, which occurs as a result of its watch dog timer no longer being set.

As shown in FIG. 4, there are four states possible in the state machine, i.e., idle default 400, active candidate 410, active 420, and unused state 430. Inputs to the state machine are the ID (e.g., 0 equals controller 0 slot, 1 equal controller 1 slot), SOS (state of the other side), with 1=idle, 0=active or active candidate, and WD (watch dog timer), with 0=idle, and 1=attempt to become active or stay active. Outputs from the state machine are an enable signal (EN) which enables the outputs controlled by the associated controller, and a state of this side (STS) signal which is set when the state is active candidate or active controller. An "X" input in FIG. 4 indicates a don't care input for moving between the states of the state machine.

Upon startup, the state machine is in idle default state 400 and remains there until SOS and WD both equal 1, at which point the state machine enters the active candidate state 410. To transition from active candidate 410 to active controller state 420 requires that the controller be controller 0 and its watch dog timer is set, or the ID be controller 1, with SOS equal to 1 and WD equal to 1. Once entered, the state machine stays in the active state 420 until its watch dog timer 410 times out, at which point it returns to the idle default state 400. From the active candidate state 410, the state machine can also revert to the idle default state 400 if its ID is controller 1, and the state of the other side is active, or if its watch dog timer is idle. The unused state 430 could accidentally be entered at power up, and there is an auto feature which allows the state machine to initially jump to the idle default state 400 irrespective of the inputs.

To summarize, those skilled in the art will note from the above description that provided herein is an arbitration mechanism for redundant controllers which provides an output enablement signal based on status of both redundant controllers, and an arbitration scheme for automatically determining which controller should be active controller and which should be idle controller. A means for automatically monitoring for controller failure and switching over control to another controller of the redundant controllers is also provided. The arbitration mechanism can employ a hardware output interlock such that outputs enabled by only one controller are active at a time, thereby avoiding conflicting data or potential damage to the outputs and/or the device under control. In one embodiment, the arbitration mechanism employs hardwired control bits for each redundant controller to identify the controllers, a software arbitration component for determining the active controller and idle controller, as well as the switchover capability, a watch dog timer for each controller's hardware arbitration component, and a state machine to control enablement of the outputs controlled by the redundant controllers.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for providing arbitration for redundant controllers comprising:

a controller to automatically determine which controller of redundant controllers is active controller, wherein outputs of the redundant controllers are electrically directly wired together and provided as input to at least one device;

multiple arbitration components, the multiple arbitration components including a first hardware arbitration component for a first controller of the redundant controllers, and a second hardware arbitration component for a second controller of the redundant controllers, the first hardware arbitration component being connected to the outputs of the first controller, and the second hardware arbitration component being connected to the outputs of the second controller, the first hardware arbitration component ensuring that the outputs of the first controller are enabled as input to the at least one device only when the first controller is the active controller, and the second hardware arbitration component ensuring that the outputs of the second controller are enabled as input to the at least one device only when the second controller is the active controller, and wherein the first hardware arbitration component and the second hardware arbitration component are separate hardware components which communicate and cooperate as a distributed hardware interlock mechanism that ensures outputs of only one of the first controller or the second controller of the redundant controllers are enabled at a time; and wherein the first hardware arbitration component and the second hardware arbitration component each comprise a hardware state machine to enable/disable the outputs of its associated controller of the redundant controllers and ensure that outputs of only the active controller are enabled as input to the at least one device.

2. The system of claim 1, further comprising means for providing a unique identification for each controller of the redundant controllers, wherein the logic for automatically determining comprises means for employing the unique identifications to automatically determine which controller of the redundant controllers is active controller.

3. The system of claim 2, wherein the means for providing unique identifications for the redundant controllers comprises means for providing hardwired identification bits for each controller of the redundant controllers.

4. The system of claim 1, further comprising logic for monitoring the active controller for possible failure, and upon detection of failure, for automatically switching active control to another controller of the redundant controllers, wherein the automatically switching of active control is transparent to the at least one device.

5. The system of claim 4, wherein the logic for monitoring comprises means for employing a watch dog timer for the active controller of the redundant controllers, and for detecting failure of the active controller when the watch dog timer of the active controller expires.

6. The system of claim 1, wherein each arbitration component of the multiple arbitration components further includes a watchdog timer for its associated controller of the redundant controllers, and wherein the hardware arbitration components are coupled together to provide status of the individual watchdog timers to each hardware state machine of the arbitration components as input, wherein the hardware state machines employ the status of the watchdog timer signals to determine, separately from the logic for automatically determining, which controller of the redundant controllers is to have outputs enabled for input to the at least one device.

* * * * *